United States Patent [19]

Plymate

[11] 4,377,569

[45] Mar. 22, 1983

[54] METHOD OF TREATING ANIMALS TO RESIST INFECTIOUS DISEASES

[76] Inventor: Robert R. Plymate, Rte. 2, Oakland, Nebr. 68045

[21] Appl. No.: 265,327

[22] Filed: May 19, 1981

Related U.S. Application Data

[63] Continuation-in-part of Ser. No. 114,375, Jan. 21, 1980, abandoned.

[51] Int. Cl.³ ............................................. A61K 39/395
[52] U.S. Cl. ...................................... 424/85; 424/87; A61K/39/40
[58] Field of Search ................................... 424/85, 87

[56] References Cited

U.S. PATENT DOCUMENTS 3,376,198  4/1968  Peterson et al. ................. 424/85
4,051,235  9/1977  Plymate ............................ 424/85

OTHER PUBLICATIONS

Petersen et al., Quaterly Review of Allergy and Applied Immunology, vol. 10, No. 2, (Jun. 1956), pp. 185 and 186.
C. A. 45:10328c (1951).

Primary Examiner—Sam Rosen
Attorney, Agent, or Firm—Zarley, McKee, Thomte, Voorhees & Seas

[57] ABSTRACT

A method of treating an adult animal to successfully resist infectious diseases includes orally administering to the animal a mixture of an animal feed and the additive produced by the following process at the rate of one to two pounds of additive per ton of animal feed:
collecting bovine colostrum milk,
removing substantially all of the fat from the colostrum milk,
removing the casein from the colostrum milk to obtain bovine colosteral whey,
dialyzing the whey,
adjusting the pH of the dialysate to 4.0 to 4.5, precipitating the whey,
removing the supernatant from the precipitated whey,
clarifying the supernatant,
adding a water, saline and phenol mixture to the clarified supernatant to obtain the desired concentration,
sterilizing the mixture, and
drying the mixture.

6 Claims, No Drawings

METHOD OF TREATING ANIMALS TO RESIST INFECTIOUS DISEASES

CROSS-REFERENCE TO RELATED APPLICATION

This is a continuation-in-part application of my previous U.S. patent application Ser. No. 114,375 filed Jan. 21, 1980, now abandoned.

BACKGROUND OF THE INVENTION

Bovine milk contains one or more proteins of the globulin group although the amount present is usually quite small. The globulin group is generally considered to be comprised of lactoglobulin or beta lactoglobulin. The globulin of milk is very important. Under certain conditions it enables a mother to transmit immunity toward certain infections to her suckling. This takes place during the first two or three days of the young animal's life.

During the first few days of lactation, the secretion of the mammary gland differs a great deal from that of normal milk. The secretion is called colostrum. The first colostrum is very rich in globulin and fills the special needs of the newborn animal. Among these is a need for globulin, for the blood of the newborn of many species contains much less than the normal amount of this protein. Colostrum is an important source of antibodies for the newborn. The antibodies may either be the globulins themselves or are associated with the globulins. Colostrum is generally believed to be important in the case of the cow, goat, sheep, pig and mare.

Whereas it has previously been known in the art to treat newborn calves no older than sixty days of age with colostrum milk, it has heretofore been believed that such treatment would be ineffective for adult animals. This is because the gut walls of a calf change at a very young age so as to prevent the passage of the relatively large antibodies through them. Consistent with the prior belief that colostrum should only be beneficial to the very young, it has been the usual practice for dairymen to simply dispose of the colostrum milk not knowing that it could be beneficial when used in the feed for adult animals as well.

In applicant's earlier U.S. Pat. No. 4,051,235, the method of preparing bovine colostrum is described. It has been found that the bovine colostrum of the earlier patent may be air dried and added to animal feeds without the necessity of injecting the colostrum into the animal.

DESCRIPTION OF THE PREFERRED METHOD

As previously stated, colostrum milk has been shown to be an important factor in the resistance of infectious diseases in the young newborn which was nature's purpose for providing colostrum milk. The antibodies found in colostrum milk help the newborn fight diseases as well as protect them from future infection through immunal responses. It has also been found that a cow can be stimulated to produce certain antibodies to bacteria by injecting the cow before calving with antigens to the antibodies desired. Further, it has been found that a cow which has been subjected to many diseases during its lifetime will also have produced certain antibodies. When the cow calves, the first milk produced by the cow will contain antibodies to the stimulants as well as the normal environmental antibodies present in the mammary.

The colostrum milk is collected and the antibodies are removed therefrom and are manufactured into a dried product which may be added to animal feeds to benefit other animals which may be subjected to the diseases which the particular antibodies are peculiar to. Contrary to the prior beliefs of dairy scientists, the other animals which will benefit by having the dried colostrum product added to their feeds include both adult cattle as well as animals of other species such as the goat, sheep, pig and mare.

Assuming that the cow has either been injected with certain antigens or that the cow simply has the normally occurring antibodies in the colostrum milk, the colostrum milk is collected after calving. Preferably, the colostrum milk is collected and frozen until a suitable quantity has been collected to enable the process to be carried out. The freezing of the colostrum milk also aids in subsequent removal of the fat from the colostrum milk. Examples I and II are two examples wherein the antibodies were recovered from the colostrum milk. Example I is the preferred process of recovering the antibodies while Example II is an alternate method for recovering the antibodies.

EXAMPLE I (PREFERRED)

The colostrum milk is collected and frozen. The milk is defatted by partially thawing the frozen milk and skimming the top liquid therefrom. The remaining milk is then completely thawed and centrifugally separated to remove as much of the remaining fat as possible.

The defatted colostrum milk is then precipitated by adding 1.5 mg of $CaCl_2$ per liter of milk and by adding one tablet (1.5 gram) of commercially available rennin per liter of milk. The mixture is then thoroughly stirred. The solution is then heated to 20°–80° C. and again stirred. The solution is permitted to stand for 2–5 hours and the casein in the solution is then removed by filtration. The resultant solution is termed "bovine colosteral whey".

The whey is then dialyzed against tap water at 47° F. with saline added for approximately 96 to 120 hours. The pH of the dialysate is adjusted to 4.0 to 4.5 with acetic acid. The whey is then precipitated by placing the same in vats having a controlled temperature of 35°–65° F. The supernatant is siphoned off and centrifuged. The supernatant is then clarified by filtration. The titre of the solution is determined in conventional fashion and a water, saline and 0.3% Phenol mixture is added to make a final bovine IGG concentration of 100 mg%.

The solution is then passed through a water sterilizer (ultraviolet). The solution is then air dried until a powder-like product is achieved. The dry product is then added to animal feeds such as silage, etc., in the preferred proportion of 1 to 2 pounds of additive per ton of animal feed.

EXAMPLE II

The colostrum milk is collected and centrifugally separated to remove as much of the fat as possible.

The defatted colostrum milk is then precipitated by adding 1.0–2.0 mg of $CaCl_2$ per liter of milk and by adding 0.5–1.5 tablets of commercially available rennin per liter of milk. The mixture is then thoroughly stirred. The solution is then heated to 20°–80° C. and again stirred. The solution is permitted to stand for 2–5 hours and the casein in the solution is then removed by filtration. The resultant solution is termed "bovine colosteral whey".

The whey is then dialyzed against tap water at 40°-54° F. with saline added for approximately 96 to 120 hours. The pH of the dialysate is adjusted to 4.0 to 4.5 with acetic acid. The whey is then precipitated by placing the same in vats having a controlled temperature of 35°-65° F. The supernatant is siphoned off and centrifuged. The supernatant is then clarified by filtration. The titre of the solution is determined in conventional fashion and a water, saline and 0.3% Phenol mixture is added to make a final bovine IGG concentration of 100 mg%.

The solution is then passed through a water sterilizer (ultraviolet). The solution is then air dried until a powder-like product is achieved. The product is then added to animal feeds in the preferred proportion of 1 to 2 pounds of additive per ton of animal feed.

The dry product of Examples I and II, when added to the animal feed, provides the animals with the necessary antibodies to enable the animal to successfully resist the diseases which the particular antibodies are peculiar to.

The effectiveness of bovine colostrum in the gut has been demonstrated by tests which show that as little as one ounce of colosteral whey destroys Coliform 99 bacteria in the gut of young calves. In tests in which five grams of the dry product of Examples I and II was fed with feed, sub-clinical mastitis has been successfully reduced 60% in three herds with a thirty cow average, using the CMT paddle test. Most sub-clinical mastitis was found to be caused by Staph, Strep combinations. There are naturally occurring antibodies to Staph and Strep in the colostrum milk obtained for producing the dry product described above.

As an alternative to air drying, a freeze drying process may be utilized but it is recommended that the colostrum be mixed with egg albumin to stabilize it and to maintain its viability. Accordingly, the antibodies can then be reactivated in the gut of an animal.

Thus it can be seen that the method of this invention accomplishes at least all of its stated objectives.

I claim:

1. A method of treating an adult animal to successfully resist infectious diseases including orally administering to said animal a mixture of an animal feed and an additive at the rate of 1 to 2 pounds of additive per ton of animal feed: said additive produced by the process of collecting bovine colostrum milk including antibodies particular to said infectious diseases, removing substantially all of the fat from the colostrum milk, removing the casein from the colostrum milk to obtain bovine colosteral whey, dialyzing the whey, adjusting the pH of the dialysate to 4.0-4.5, precipitating the whey, removing the supernatant from the precipitated whey, clarifying the supernatant, adding a water, saline and phenol mixture to the clarified supernatant to obtain the desired concentration, sterilizing the mixture, and drying the mixture.

2. The method of claim 1 wherein said adult animal is other than cattle.

3. The method of claim 1 wherein said infectious diseases include mastitis.

4. The method of claim 3 wherein the antibodies particular to mastitis are naturally occurring in the bovine colostrum milk.

5. The method of claim 1 wherein the mixture is air dried.

6. The method of claim 1 wherein the step of drying the mixture includes mixing said mixture with egg albumin to produce a resultant mixture, thereby stabilizing the mixture and maintaining the viability thereof, and freeze drying said resultant mixture.

* * * * *